(12) United States Patent (10) Patent No.: US 11,054,520 B2
Zhu et al. (45) Date of Patent: Jul. 6, 2021

(54) METHOD AND SYSTEM FOR ULTRASOUND TIME-OF-FLIGHT MEASUREMENT

(71) Applicant: Texas Instruments Incorporated, Dallas, TX (US)

(72) Inventors: Yuming Zhu, Plano, TX (US); Srinath Ramaswamy, Murphy, TX (US); Domingo Garcia, Plano, TX (US); Sujeet Milind Patole, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1009 days.

(21) Appl. No.: 15/225,134

(22) Filed: Aug. 1, 2016

(65) Prior Publication Data

US 2017/0052253 A1 Feb. 23, 2017

Related U.S. Application Data

(60) Provisional application No. 62/205,821, filed on Aug. 17, 2015.

(51) Int. Cl.
*G01S 15/00* (2020.01)
*G01S 15/10* (2006.01)
*G01N 29/07* (2006.01)
*G01N 29/11* (2006.01)
*G01N 29/14* (2006.01)
(Continued)

(52) U.S. Cl.
CPC .............. *G01S 15/10* (2013.01); *G01N 29/07* (2013.01); *G01N 29/075* (2013.01); *G01N 29/11* (2013.01); *G01N 29/12* (2013.01);

*G01N 29/14* (2013.01); *G01S 7/539* (2013.01); *G01S 15/582* (2013.01); *G01N 2291/011* (2013.01); *G01N 2291/014* (2013.01); *G01N 2291/0258* (2013.01); *G01S 15/003* (2013.01)

(58) Field of Classification Search
None
See application file for complete search history.

(56) References Cited

U.S. PATENT DOCUMENTS 3,495,242 A * 2/1970 Dickey, Jr. ............ G01S 13/526
342/199
4,837,578 A * 6/1989 Gammell ................ G01S 7/292
342/134

(Continued)

OTHER PUBLICATIONS

Angrisani, Leopoldo, and R. Schiano Lo Moriello. "Estimating ultrasonic time-of-flight through quadrature demodulation.";IEEE transactions on instrumentation and measurement;55.1 (2006): 54-62. (Year: 2006).*

(Continued)

*Primary Examiner* — Isam A Alsomiri
*Assistant Examiner* — Jonathan D Armstrong
(74) *Attorney, Agent, or Firm* — Brian D. Graham; Charles A. Brill; Frank D. Cimino (57) ABSTRACT

A transducer system with transducer and circuitry for applying a pulse train at a single frequency to excite the transducer. The transducer is operable to receive an echo waveform in response to the pulse train. The system also comprises circuitry for determining a time of flight as between a first reference time associated with the pulse train and a second reference time associated with the echo waveform.

19 Claims, 5 Drawing Sheets

(51) Int. Cl.
 *G01S 7/539* (2006.01)
 *G01S 15/58* (2006.01)
 *G01N 29/12* (2006.01)

(56) References Cited

U.S. PATENT DOCUMENTS

| | | | | |
|---|---|---|---|---|
| 5,117,698 | A * | 6/1992 | Baumoel | G01F 1/667 |
| | | | | 73/861.28 |
| 5,325,130 | A * | 6/1994 | Miller | H04N 5/211 |
| | | | | 257/183.1 |
| 5,383,462 | A * | 1/1995 | Hall | G01S 7/52033 |
| | | | | 600/454 |
| 5,924,991 | A * | 7/1999 | Hossack | A61B 8/14 |
| | | | | 128/916 |
| 6,137,842 | A * | 10/2000 | Grossnickle | G01S 5/06 |
| | | | | 342/450 |
| 7,397,427 | B1 * | 7/2008 | Rhoads | G01S 3/043 |
| | | | | 342/442 |
| 7,513,160 | B2 * | 4/2009 | Lynch | G01S 15/003 |
| | | | | 73/599 |
| 7,543,508 | B2 * | 6/2009 | Lang | G01F 1/66 |
| | | | | 73/861.28 |
| 7,701,380 | B2 * | 4/2010 | Aites | G01S 13/9029 |
| | | | | 342/25 F |
| 2003/0035342 | A1 * | 2/2003 | Harrington | G01S 7/52026 |
| | | | | 367/127 |
| 2004/0135992 | A1 * | 7/2004 | Munro | G01S 7/483 |
| | | | | 356/4.01 |
| 2017/0052148 | A1 * | 2/2017 | Estevez | G01N 29/11 |

OTHER PUBLICATIONS

Guyomar, Daniel, et al. "A self-synchronizing and low-cost structural health monitoring scheme based on zero crossing detection."; Smart Materials and Structures 19.4 (2010): 045017. (Year: 2010).*

Beastie. "15 Auld Lang Sine"; https://web.archive.org/web/20100610092857/http://beastie.cs.ua.edu/sway/tcop/book_16.html (2010). (Year: 2010).*

* cited by examiner

METHOD AND SYSTEM FOR ULTRASOUND TIME-OF-FLIGHT MEASUREMENT

CROSS-REFERENCES TO RELATED APPLICATIONS

This application claims priority to, the benefit of the filing date of, and hereby incorporates herein by reference, U.S. Provisional Patent Application 62/205,821, entitled "METHOD AND SYSTEM FOR ULTRASOUND TIME-OF-FLIGHT MEASUREMENT," and filed Aug. 17, 2015.

STATEMENT REGARDING FEDERALLY SPONSORED RESEARCH OR DEVELOPMENT

Not Applicable.

BACKGROUND OF THE INVENTION

The preferred embodiments relate to ultrasonic transducers and more particularly to a method and system for ultrasound time of flight (TOF) measurement.

Ultrasound transducers are known in the art for transmitting ultrasound waves and detecting a reflection or echo of the transmitted wave. Such devices are also sometimes referred to as ultrasound or ultrasonic transducers or transceivers. Ultrasound transducers have myriad uses that produce an output or other result based on a distance determination from the operation of the transceiver, whereby the transceiver emits a series of pulses toward a target and then receives back an echo waveform of the signal off the target, and signal processing determines a distance to the target based in part on the elapsed timing between the transmitted pulses and the echo waveform. The output of such a system may be the distance determination itself, or the distance determination may be part of an additional determination or action based on the distance, such as displacement measurement, level sensing, material characterization, structure monitoring, vibration sensing, medical diagnostics, and the like. In any event, for various of these applications, precision of the distance measurement may be very important.

Figure 1:
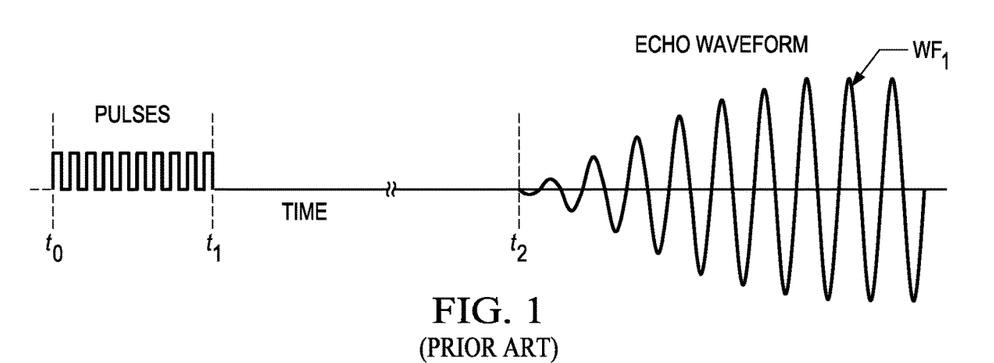
FIG. 1 illustrates a signal diagram of the operation of a typical prior art ultrasound transducer, in first transmitting a signal and then receiving an echo waveform.

By way of further background, FIG. 1 illustrates a signal diagram of the operation of a typical prior art ultrasound transducer, in first transmitting a signal and then receiving an echo waveform. Specifically, at a time $t_0$, an excitation pulse train is applied to the transducer, which in response transmits a corresponding ultrasonic pulse train signal, where both the applied and transmitted pulse trains consist of a number of pulses, such as 5 to 20 such pulses, shown beginning therefore at time $t_0$ and ending at time $t_1$. The transmitted pulses are directed toward a target item, which reflects a signal back toward the transducer. Time passes as these signals pass along a channel or medium between the transducer and the target. This time may be referred to in the art as time of flight (TOF) and therefore occurs between times $t_0$ and $t_2$. Note also that TOF may be measured as between offset times from either or both of times $t_0$ and $t_2$. For example, rather than TOF starting at $t_0$ when the pulse train commences, it may be started later, such as when the pulse train completes. Similarly, rather than TOF ending at $t_2$ when the echo waveform commences, it may be ended later, such as when the echo waveform reaches a threshold. Additional details as to the latter are described later in this document.

At time $t_2$, the transducer begins to receive back an echo waveform $WF_1$ signal, reflected by the target, as shown by the echo waveform that begins at time $t_2$. Echo waveform $WF_1$ is generally a sinusoid that starts at or near time $t_2$ with a relatively low amplitude and then the amplitude continues to increase for some amount of time. While not shown in FIG. 1, the waveform $WF_1$ (and amplitude) will eventually decay, although for sake of the teachings in this document the decay period is not of particular relevance as signal processing relies instead on the increasing amplitude period of the echo waveform $WF_1$. Specifically, processing circuitry (e.g., a processor), associated with or coupled to the transducer, is operable to sample this received waveform $WF_1$ so as to develop a time reference from $t_0$ to a detected point in the waveform. This detected point is also sometimes referred to as TOF, although it occurs in the echo waveform after $t_2$. Further, by detecting a certain time event in the waveform, a reference is created in one pulse repetition cycle (PRC), that is, in one instance of a pulse train followed by an echo waveform, so that this reference may be compared against a similar time reference in subsequent PRCs, whereby a change in reference thereby indicates a change in distance between the transducer and the target. In any event, there are various prior art approaches for detecting this time event in the echo waveform.

Figure 2:
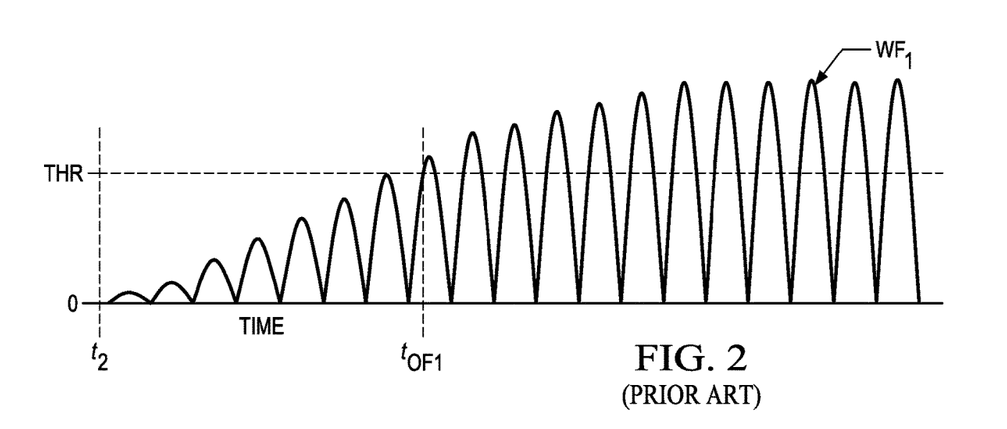
FIG. 2 illustrates a prior art received rectified echo waveform evaluated for when the signal amplitude reaches a threshold.

FIG. 2 illustrates a signal diagram in connection with explaining one prior art approach for detecting a time reference in a received echo waveform. First in connection with FIG. 2, note that the echo waveform of FIG. 1 is received, and it applied to a rectifier so that any negative portion of the signal is thereby converted to a positive signal, so that the entire sinusoid is at or above zero amplitude. Moreover, per one prior art approach, the waveform time reference for a PRC is determined once the amplitude (or magnitude, if not rectified) reaches a threshold THR. Thus, as shown in FIG. 2, this occurs at what is shown as a first TOF at $t_{OF1}$, that is, where the waveform amplitude reaches THR. In this approach, therefore, the first TOF at $t_{OF1}$ becomes a first reference that may be compared to the reference TOF for comparably-performed time detections for subsequent (or earlier) PRCs.

Figure 3:
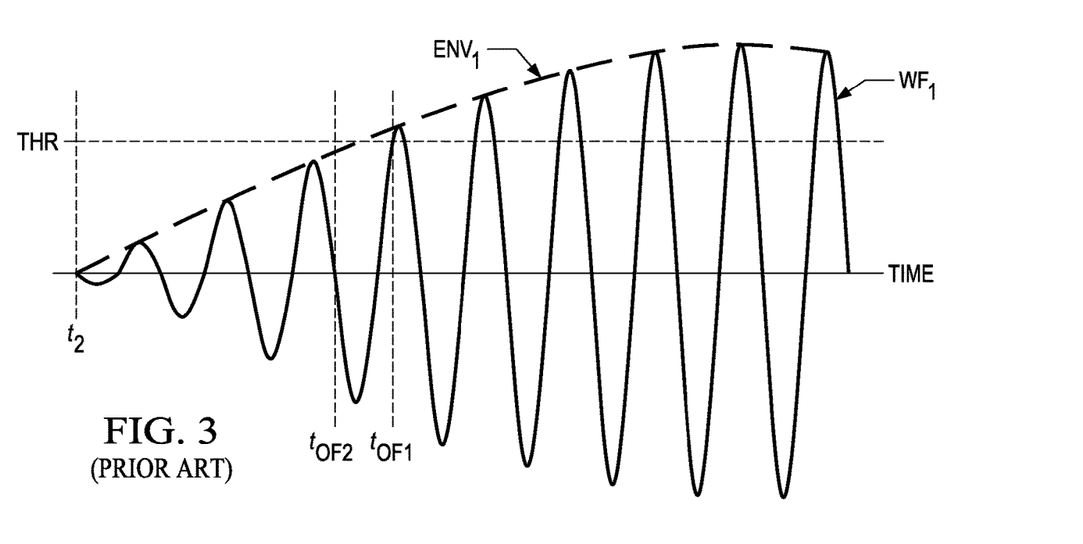
FIG. 3 illustrates a prior art received echo waveform evaluated for when an envelope of the signal amplitude reaches a threshold.

FIG. 3 illustrates a signal diagram in connection with explaining another prior art approach for detecting a time reference in a received echo waveform $WF_1$, and for sake of contrast the first TOF at $t_{OF1}$ from FIG. 2 is also copied into FIG. 3. In FIG. 3, an envelope detector is also used to process the echo waveform, thereby creating an envelope $ENV_1$ signal or measure, as shown by an additional dashed line in FIG. 3. Moreover, per this prior art approach, the waveform time reference for a PRC is determined once the envelope reaches the threshold THR. Thus, in FIG. 3, this occurs at what is shown as a TOF at $t_{OF2}$, that is, where the waveform envelope $ENV_1$ reaches THR. Note, however, that the envelope reaches the threshold THR at $t_{OF2}$, which is before the actual increasing amplitude of the echo waveform does so at $t_{OF1}$. Thus, the envelope $ENV_1$ has a smoothing and interpolating function as between the successive increasing amplitude signal swings of the waveform so as to give a better approximation of when the energy of the waveform exceeds the threshold THR, and may provide better detection thereof, as compared to the approach of FIG. 2.

Figure 4:
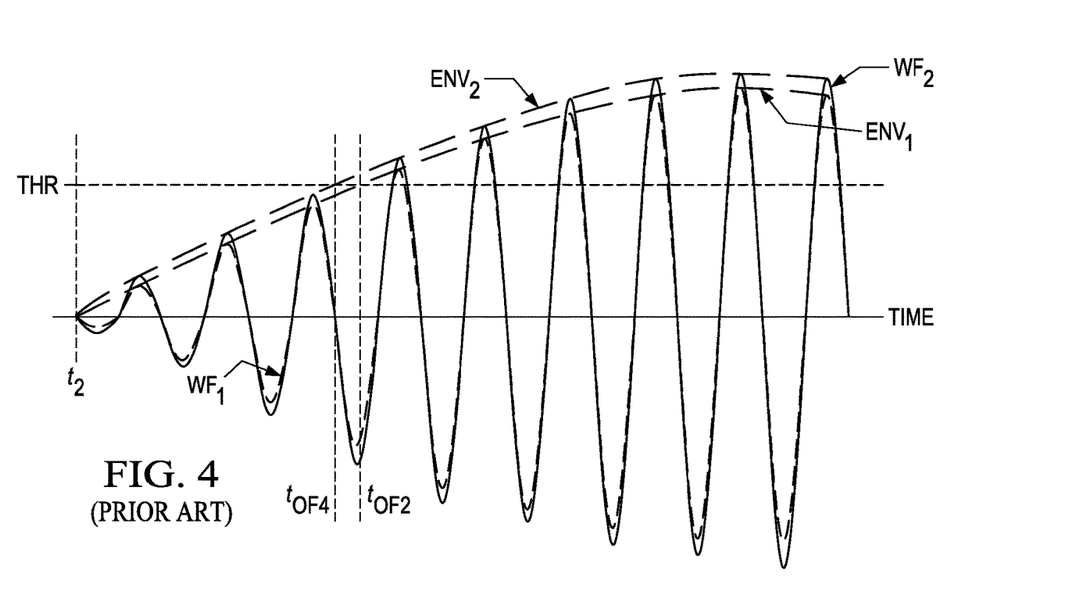
FIG. 4 illustrates a prior art received echo waveform evaluated for when an envelope of the signal amplitude reaches a threshold, wherein successive instances of the echo waveform have differing envelopes.

While the envelope approach of FIG. 3 performs better than the amplitude approach of FIG. 2, FIG. 4 illustrates a limitation of the envelope approach. Specifically, FIG. 4 includes the same waveform $WF_1$ (and its envelope $ENV_1$) of FIGS. 1 and 3, but to make the illustration clear that waveform is shown in a dashed line. Particularly, FIG. 4 also illustrates a second waveform $WF_2$ intending to depict the echo waveform from a second set of transmitted pulses (i.e., a second PRC). As shown in FIG. 4, therefore, the second waveform $WF_2$ has a slightly increased amplitude, as compared to the first waveform $WF_1$. Such a response may be received due to noise or the shape or size of the target. With the increase in amplitude in the second waveform $WF_2$, then its envelope $ENV_2$ necessarily increases in value at a faster rate than that of the envelope $ENV_1$ of the first waveform $WF_1$. Thus, note in FIG. 4 that the time when the envelope $ENV_2$ crosses the threshold THR occurs at $t_{OF4}$, which is earlier than the $t_{OF2}$ time that envelope $ENV_1$ (of waveform $WF_1$) crossed that threshold. Note that such a change in detected timing, therefore, can create erroneous results in the distance measure of the transducer system. Specifically, even if the target did not move from the time of the first PRC to the time of the second PRC, the system detects a change in TOF (i.e., between $t_{OF4}$ and $t_{OF2}$), which is thereby interpreted as a change in distance as between the PRCs. Thus, the noise or other cause in the amplitude variations between successive PRCs creates error in the distance measure.

Given the preceding, the preferred embodiments seek to improve upon the prior art, as further detailed below.

BRIEF SUMMARY OF THE INVENTION

In a preferred embodiment, there is a transducer system. The system comprises a transducer and circuitry for applying a pulse train at a single frequency to excite the transducer. The transducer is operable to receive an echo waveform in response to the pulse train. The system also comprises circuitry for determining a time of flight as between a first reference time associated with the pulse train and a second reference time associated with the echo waveform. The circuitry for determining comprises: (i) circuitry for estimating an amplitude waveform envelope for at least a portion of the echo waveform; (ii) circuitry for identifying a first time when the amplitude waveform envelope reaches a threshold; and (iii) circuitry for adjusting the first time to the second reference time, in response to a phase of the echo waveform.

Numerous other inventive aspects are also disclosed and claimed.

DETAILED DESCRIPTION OF EMBODIMENTS

FIGS. 1 through 4 were described in the earlier Background of the Invention section of this document and the reader is assumed to be familiar with the principles of that discussion.

Figure 5:
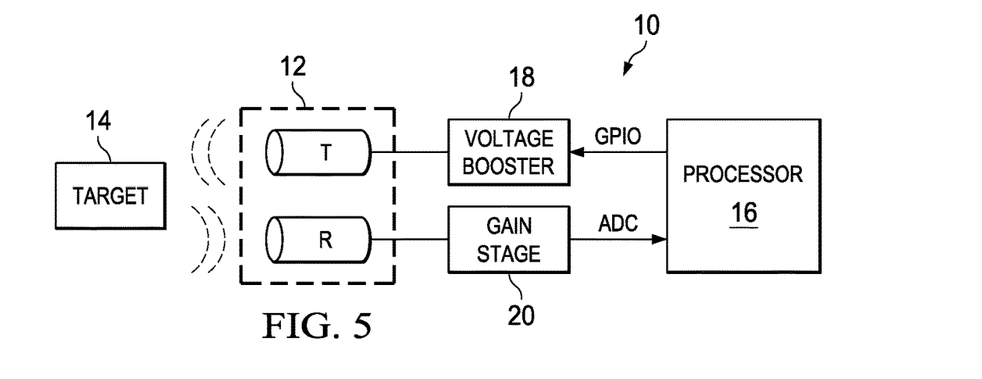
FIG. 5 illustrates a block diagram of a transducer 10 according to a preferred embodiment.

FIG. 5 illustrates a block diagram of transducer system 10 according to a preferred embodiment. System 10 includes an ultrasonic transducer 12 that for illustrative purposes is shown having a transmitting T and receiving R element, where those elements may be combined as known in the art. Transducer 12 is constructed of known (e.g., piezoelectric) materials and is operable to transmit ultrasound waves toward a target 14 and receives an echo waveform in response to reflections of the transmitted signal. More specifically, a processor 16 is coupled (e.g., via general purpose input/output GPIO) to an optional voltage booster 18, whereby processor 16 can output a pulse width modulated pulse train that is thereby voltage boosted and applied to the transmitting element T of transducer 12. The voltage boosted and pulsing input signal causes vibrations in the material of the transmitting element T of transducer 12, thereby emitting a typically directional wave signal toward target 14. When an echo waveform is reflected back to the receiving element R of transducer 12, that receiving element R responds with an electrical signal corresponding to the echo waveform. In system 10, the echo waveform is applied to a gain stage 20, which in a preferred embodiment amplifies the signal and also performs an analog-to-digital (ADC) conversion. The resultant digital signal is then connected to processor 16, which samples the digital signal at some desired sampling frequency, $f_S$, and processor 16 is further programmed to perform additional processing of the digital samples as detailed in the remainder of this document. Among such processing, processor 16 is able to determine an indication of time of flight (TOF) between the transmitted pulse signal and the received echo waveform (or a reference point in that waveform), thereby representing a distance between transducer 12 and target 14, where that distance may be the desired output from processor 16 or may be further processed in connection with other common transducer applications which process the distance measure further for additional determinations.

Figure 6:
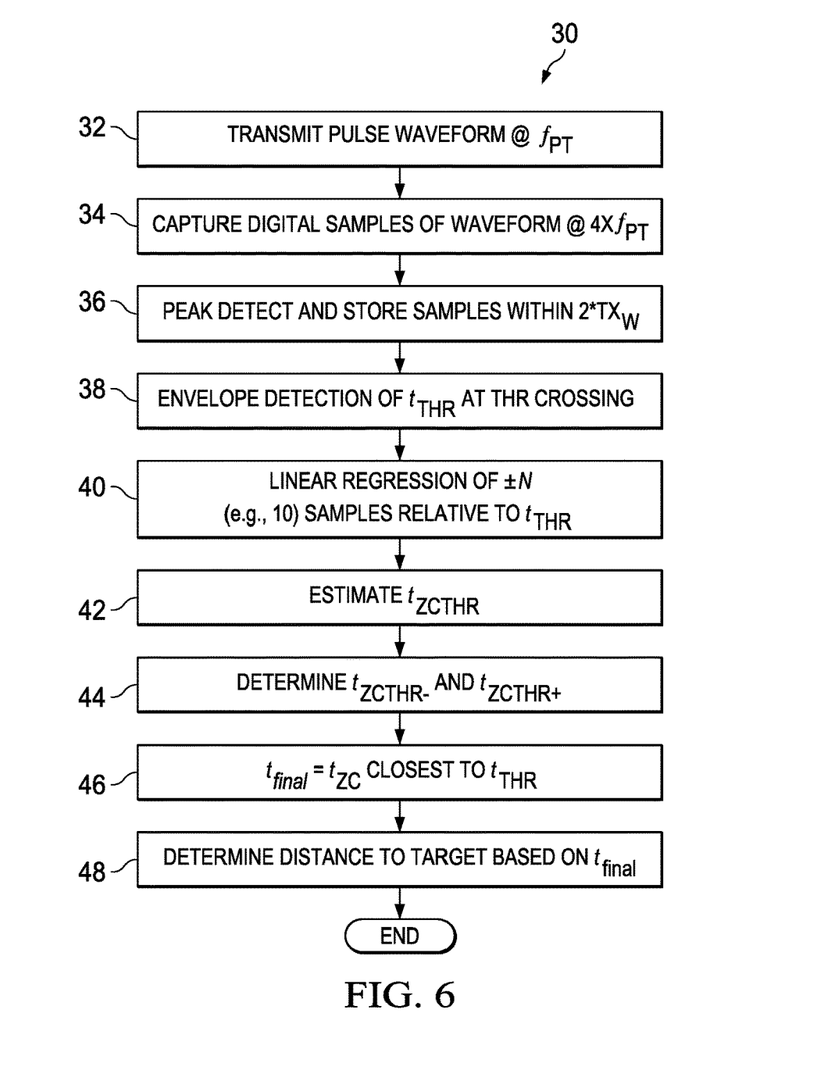
FIG. 6 illustrates a flowchart of a method of operation of the system from FIG. 5.
Figure 7:
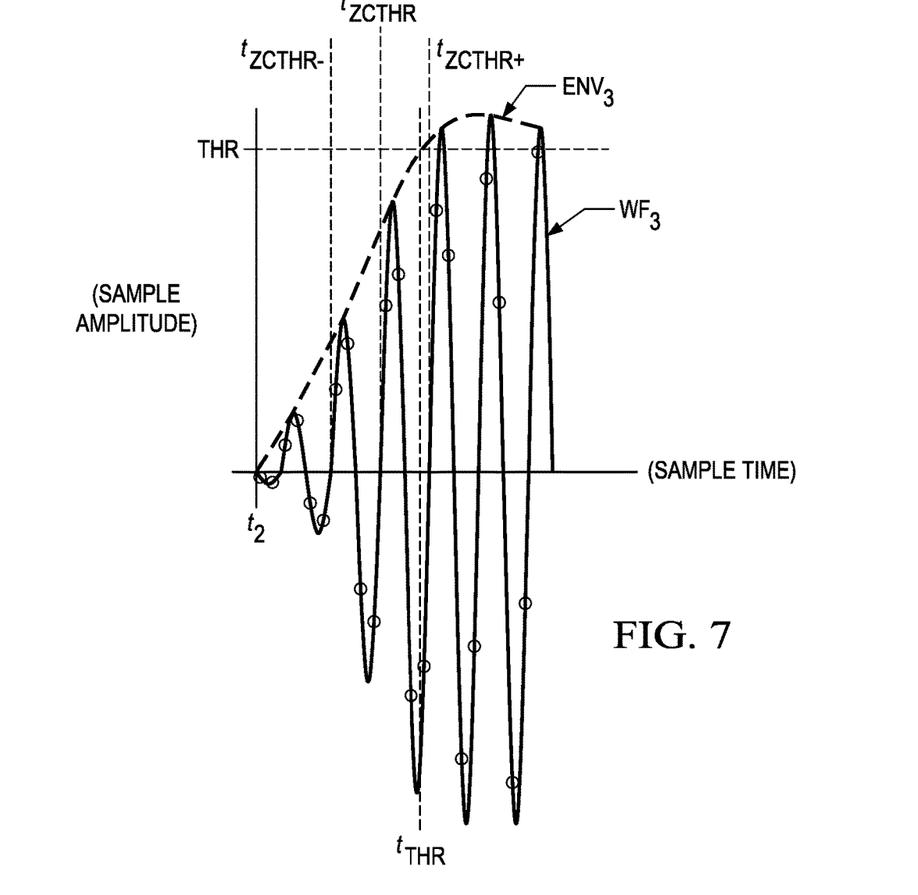
FIG. 7 illustrates a sampled reflected echo waveform according to a preferred embodiment and for which a waveform envelope is evaluated to detect when a threshold is reached.

FIG. 6 illustrates a flowchart of a method 30 of operation of processor 16 from system 10, as may be implemented with appropriate software instructions stored in or accessible by, and or via hardware/firmware of, processor 16, or any combination thereof. Method 30 commences with a step 32, where system 10 transmits an excitation pulse train such as shown in FIG. 1, where for reference the frequency of the pulses is referred to a $f_{PT}$. Thus, in system 10, processor 16 outputs the pulse train via GPIO, and it is optionally boosted by booster 18 and applied to the transmitting element T of transducer 12. In response, ultrasonic waves are directed toward target 14, and an echo waveform, also having a frequency of $f_{PT}$, is reflected back toward the receiving element R of transducer 12. For continuing discussion in this document, FIG. 7 illustrates such a reflected echo waveform $WF_3$, which as introduced earlier has an increasing amplitude for a period of time after which it will begin to decay. Next, method 30 continues to step 34.

In step 34, processor 16 captures digital values (i.e., samples) of the reflected waveform amplitude into on-chip or off-chip memory, preferably at an integer multiple IM of $f_{PT}$ so that IM samples are captured for each period of transmitted pulse; in one preferred embodiment, IM=4, so the sampling frequency, $f_S$, for step 34 is $4*f_{PT}$. In FIG. 7, therefore, for each $2\pi$ period of the generally sine wave shape of waveform $WF_3$, four circles are shown along each $2\pi$ wave period, each intending to illustrate a respective one of four samples captured during that period and per step 34. Note that for each digital captured sample amplitude, also stored is the timing of the sample. Such timing may be determined by a count either of processor clock cycles or by a sequentially incrementing number of samples captured, as knowledge of the number of a sample necessarily can provide the timing of the sample by multiplying the sample number times the sample period, $T_S=1/f_S$. Next, method 30 continues to step 36.

In step 36, the peak of the received samples is identified as the sample indicating the largest amplitude (i.e., largest absolute value), where a later discussion indicates the determination of amplitude given a sample value. Once the peak is identified, a number of samples within a time window centered about the time of the detected peak are retained (e.g., in memory) for processing. The width of the time window may be selected by one skilled in the art. For example, in one preferred embodiment, the time window equals twice the length of time, $T_W$, to transmit the pulses in step 32 (e.g., from $t_0$ to $t_1$ in FIG. 1). Next, method 30 continues to step 38.

In step 38, a waveform envelope, shown by way of example in FIG. 7 as envelope $ENV_3$, is determined from the stored data samples remaining after step 36. As shown graphically in FIG. 7, such an envelope generally represents a relatively smooth curve passing in proximity to the peak amplitude for each $2\pi$ period of waveform $WF_3$. Various techniques may be selected for determining envelope $ENV_3$, where as detailed later, in a preferred embodiment one method is to filter each sample as real data to provide an imaginary counterpart (e.g., I and Q data, respectively), and then trigonometry is used to determine an approximate sine wave amplitude in response. Further in step 38, in addition to determining the envelope, detection is made of the time (either clock time or sample time) when the envelope $ENV_3$ crosses a threshold THR, as illustrated in FIG. 7 to occur at a time $t_{THR}$. The value of the threshold THR may be selected by one skilled in the art, such as at ½ the peak amplitude determined in step 36; for sake of illustrative purposes, however, in FIG. 7 the threshold THR is shown larger than ½ of the peak, so as to facilitate the remaining discussing of inventive aspects. Next, method 30 continues to step 40.

In step 40, a linear regression is performed to determine the phase of ±N step 34 (or step 36) samples, where those samples occurred relative to the time when the step 38 peak was determined. In one preferred embodiment N=10, so the phase is determined on 10 samples before $t_{THR}$ and the phase is determined on 10 samples after $t_{THR}$. Various techniques for determining phase also may be selected by one skilled in the art, and as introduced earlier where I and Q data are generated for each sample, then in that instance trigonometry also may be used to determine phase for each sample, as also detailed later. Thus, for each of the N samples, known or determined are its sample time $st_x$ and its respective phase $\theta S$, which may be represented by a coordinate pair of its sample time and phase thereby creating a sample set with 2N coordinates, as $[(st_0, \theta S_0), (st_1, \theta S_1), \ldots (st_{2N}, \theta S_{2N-1})]$. In general, for a sinusoid of either fixed or varying amplitude, the wave may be described by the following Equation 1:

$$\text{amplitude} = A\sin(\theta S) = A\sin(2\pi(f)(st) + \emptyset) \qquad \text{Equation 1}$$

where,
A is the peak amplitude,
$\theta S$ is the phase of a sample,
f is the frequency of the waveform, which here is the same as the frequency, $f_{PT}$, of the originally transmitted pulses;
st is sample time; and
ø is the phase offset (i.e., y-axis intercept).

Figure 8:
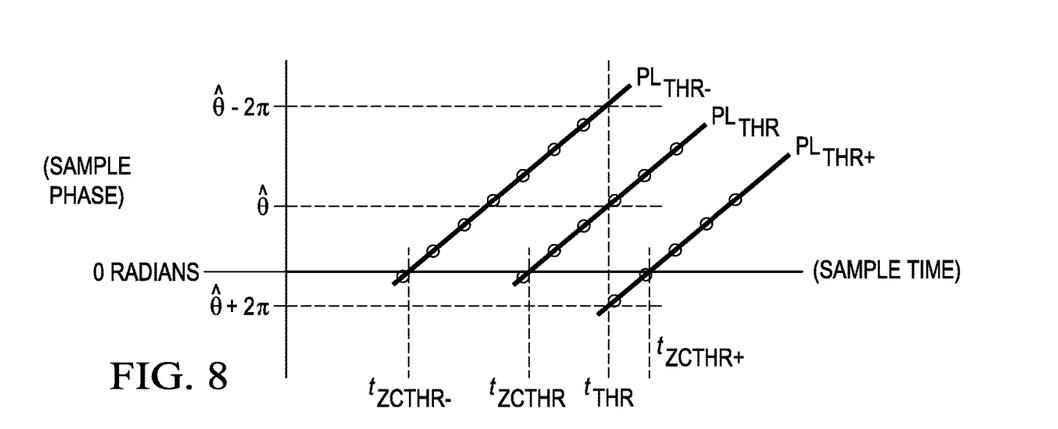
FIG. 8 illustrates a plot of phase versus time of a linear regression fit for three lines corresponding to respective $2\pi$ periods of the waveform of FIG. 7.

Note, therefore, that the parenthetical of $(2\pi(f)(st)+\emptyset)$ in Equation 1 is a line (i.e., typically referred to in geometry as y=mx+b) having slope of m=$2\pi f$ and a y-intercept of b=ø. In this regard, therefore, and by definition, linear regression will model or fit a line to the phase of the sampled data and matching the parenthetical of Equation 1, depicting the increasing phase, among the 2N (e.g., 20) samples. In this regard, FIG. 8 illustrates a plot of sample phase along the vertical axis and sample time along the horizontal axis, with a first phase line $PL_{THR}$ that results from the above-described linear regression. Thus, from samples shown also in FIG. 8 by way of circles both before and after time $t_{THR}$, line phase line $PL_{THR}$ is best fit to those samples, although to simplify the drawing only six samples are shown, rather than 20. Since phase and time are known for each sample in the set, then this line may be defined and extrapolated as desired, for example to provide the phase offset ø (i.e., y-axis intercept). Note therefore that while a sample may not have occurred at time $t_{THR}$ since that time is detected from an envelope amplitude, rather than a single sample amplitude, exceeding a threshold THR, then the line $PL_{THR}$ thereby estimates phase and timing other than at the finite sample times. Thus, an estimated phase $\hat{\theta}$ can be determined from the line $PL_{THR}$ as of the time $t_{THR}$. In addition, therefore, the line $PL_{THR}$ also indicates phase and timing for other points along the line, as will be useful as further described below. Next, method 30 continues to step 42.

In step 42, processor 16 estimates a time of the zero-phase crossing of waveform $WF_3$ that corresponds to the ±N data samples closest to time $t_{THR}$. Thus, looking to FIG. 7, where time $t_{THR}$ occurs during a $2\pi$ period for waveform $WF_3$, then step 42 attempts to determine the time $t_{ZCTHR}$ of the zero phase crossing that occurred at the beginning of the $2\pi$ period during which $t_{THR}$ occurred. In a preferred embodiment, step 42 is accomplished using the linear regression result from step 40, as is further appreciated with respect to FIG. 8. Specifically, recall that step 42 produced line $PL_{THR}$, a linear fit to phase data of the ±N data samples closest to time $t_{THR}$. As a result, this line extends to and intersects with the 0 radian axis, that is, where the estimated phase $\hat{\theta}$ equals zero. Graphically and computationally, therefore, the zero crossing of the phase axis (i.e., when phase equals 0) may be determined given Equation 1 as modeled by line $PL_{THR}$, namely, by rearranging the parenthetical of Equation 1 as shown in the following Equation 2:

$$0 = (2\pi(f_{PT})(st) + \emptyset) \qquad \text{Equation 2}$$

Rearranging Equation 2 to solve for the time when the zero crossing occurs gives the following Equation 3:

$$\frac{-\emptyset}{2\pi(f_{PT})} = t_{ZCTHR} \qquad \text{Equation 3}$$

Given the preceding, note that $t_{ZCTHR}$ provides a reference time relative to waveform $WF_3$, where that reference relates to phase (i.e., as defined by zero-crossing) of the waveform $WF_3$, rather than solely to its amplitude. In this manner, therefore, a preferred embodiment may calculate TOF as to this reference time, and thereafter distance is a straightforward relationship to rate (i.e., speed of sound) times TOF. The distance measurement therefore is responsive to a phase-related timing as between successive received echo waveforms, that is, so long as the target 14 is not moving, while the amplitude of successive echo waveforms may vary, the phase as between such successive echo waveforms is typically constant, absent any disturbance or change in the channel between transducer 12 and target 14. Thus, the preferred embodiment, in determining distance based on phase, is more accurate than prior art, amplitude-detecting-only, schemes. Moreover, in the preferred embodiment the echo waveform is efficiently created from a single frequency transmission of a pulse train. Still further, and as detailed below, an additional aspect of a preferred embodiment can incorporate still further considerations so as to reduce the chance of phase (or cycle) slip, further improving the accuracy of the resultant distance measurement, as is accomplished as shown in remaining steps in method 30, which next proceeds to step 44.

It is recognized in connection with a preferred embodiment that cycle slip may occur as between successively-received echo waveforms, that is, an erroneous detection of a single cycle away from the actual cycle in which the threshold is exceeded corresponds to one wavelength in error measurement; for example, for 40 kHz, one wavelength (i.e., λ) is 8.5 mm, so a cycle slip of a single cycle will result in a distance calculation error of 8.5 mm, which is a very large error for high resolution systems. Such an error is more likely to occur in prior art where envelope detectors are used to evaluate the reaching of a threshold. In contrast, therefore, the preferred embodiment, by identifying a zero crossing as revealed by the phase of the echo waveform, can detect changes in distance to the target as low as fractions of the wavelength λ, thereby providing the ability to detect movement down to the 100 um levels, meaning the preferred embodiment can detect very small shifts in target distance, as low as 1/85th of the wavelength, for example. This is traditionally not achievable using envelope methods, since changes in envelope at such small displacements are usually not a very robust indicator, whereas the preferred embodiment can capture such changes by evaluating relative to phase variations, rather than amplitude envelope variations. In this regard, step 44 is directed at reducing the chance for cycle slip, as may occur if $t_{THR}$ was particularly close to the $2\pi$ period of the echo waveform immediately before the period in which $t_{THR}$ occurred, or likewise if $t_{THR}$ was particularly close to the $2\pi$ period of the echo waveform immediately after the period in which $t_{THR}$ occurred. To mitigate the possibility of cycle slip, step 44 determines two additional zero crossing times, one designated as $t_{ZCTHR-}$ as the zero crossing for the $2\pi$ period of the echo waveform immediately before the period in which $t_{THR}$ occurred, and one designated as $t_{ZCTHR+}$ as the zero crossing for the $2\pi$ period of the echo waveform immediately after the period in which $t_{THR}$ occurred. In one preferred embodiment, these two additional two zero crossings are readily achievable given line $PL_{THR}$ in FIG. 8, as $t_{ZCTHR-}$ will occur at one period earlier of the echo waveform relative to $t_{ZCTHR}$, and $t_{ZCTHR+}$ will occur at one period later of the echo waveform relative to $t_{ZCTHR}$. Thus, in FIG. 8, a phase line $PL_{THR-}$ is shown having a phase of $2\pi$ earlier than line $PL_{THR}$, and a phase line $PL_{THR+}$ is shown having a phase of $2\pi$ later than line $PL_{THR}$. Moreover, phase line $PL_{THR-}$ therefore has a respective zero crossing as $t_{ZCTHR-}$, and phase line $PL_{THR-}$ therefore has a respective zero crossing as $t_{ZCTHR+}$. Next, method 30 continues to step 46.

Step 46 determines a final reference time $t_{final}$ to be used as the time reference to determine TOF for the determination of distance between transducer 12 and target 14. Thus, whereas earlier in connection with step 42 it was noted that $t_{ZCTHR}$ may be used for such a time reference, step 46 provides an alternative whereby one of either $t_{ZCTHR-}$, $t_{ZCTHR}$, or $t_{ZCTHR+}$, is selected as that reference time, so as to reduce the chance of cycle slip. In one preferred embodiment, this selection of reference time is as follows.

It is noted that $t_{THR}$ is not likely to occur exactly at a time of a sample, so in terms of sample time (i.e., an integer multiple of the time when a sample is taken), then $t_{THR}$ is a fractional value, that is, some non-integer multiple of sample time. Hence, to improve the fractional delay part of $t_{THR}$ toward a final time reference to determine TOF, a preferred embodiment determines the fractional delay portion, $t_{THRfrac}$, of $t_{THR}$, according to the following Equation 4:

$$t_{THRfrac} = t_{THR} - \text{roun}(t_{THR}) \qquad \text{Equation 4}$$

Next, the preferred embodiment calculates the time difference between the fractional delays derived from the envelope and phase, so as to improve robustness of the fractional delay computation to mitigate cycle slips due to $2\pi$ uncertainty in phase. This sub-step determines if the envelope time crossing at time $t_{THR}$ falls within the same 0 to $2\pi$ radians of the waveform $WF_3$ period when $t_{THR}$ occurred, or if it was closer to the immediately-preceding $2\pi$ cycle or to the immediately-following $2\pi$ cycle, depending on when the $t_{THR}$ crossing happened. Hence, three differential values are determined, as shown in the following Equations 5 through 7:

$$\Delta t_{ZCTHR-} = t_{THRfrac} - t_{ZCTHR-} \qquad \text{Equation 5}$$

$$\Delta t_{ZCTHR} = t_{THRfrac} - t_{ZCTHR} \qquad \text{Equation 6}$$

$$\Delta t_{ZCTHR+} = t_{THRfrac} - t_{ZCTHR+} \qquad \text{Equation 7}$$

Next, the preferred embodiment selects from the results of Equations 5 through 7 the one fractional delay estimate from phase that is closest to the fractional delay estimate from the envelope, as shown in the following Equation 8, selecting the minimum of the absolute values listed therein:

$$t_{fracfinal} = \min[\text{abs}(\Delta t_{ZCTHR-}, \Delta t_{ZCTHR}, \Delta t_{ZCTHR+})] \qquad \text{Equation 8}$$

Finally, the preferred embodiment computes the final absolute time reference for use in the TOF determination by correcting the original $t_{THR}$ estimate (from when the envelope waveform reached threshold THR) with the newer estimate, as shown in Equation 9:

$$t_{final} = t_{THR} - t_{fracfinal} \qquad \text{Equation 9}$$

Given the results of Equation 9, step 48 determines the distance from transducer 12 to target 14 using $t_{final}$ as the ultimate timing reference, again in that distance relates to TOF and the speed of sound, as shown in the following Equation 10:

$$\text{target distance} = (t_{final} - t_0) * c/2 \qquad \text{Equation 10}$$

where, $t_0$ is the time when the pulse train began transmission (see FIG. 1); and c is the speed of sound.

Note also that the calculation may include some offset from the result of this product because the detected time reference is not the beginning of the echo waveform ($t_2$ in FIG. 1), where the offset can be removed as a constant bias (i.e., calibration constant). Note also that any other potential cycle slips due to noise can be cleaned up by using a 3/N-tap median filter at the cost of latency, as the application demands.

Figure 9:
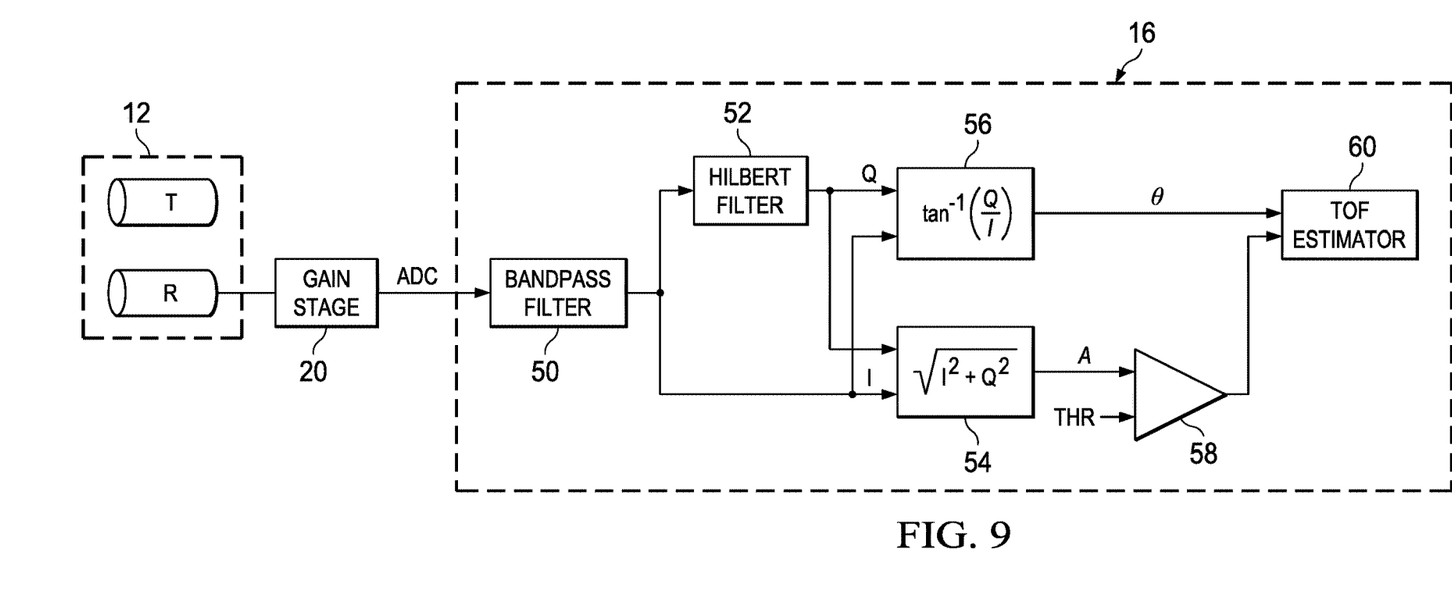
FIG. 9 illustrates a functional block diagram to summarize preferred embodiment implementation details.

FIG. 9 illustrates a functional block diagram to summarize various of the above teachings and to complete various additional detail as to certain preferred embodiment implementation details. In general, therefore, FIG. 9 again illustrates, from FIG. 5, transducer 12 and the receiver portion communicating a signal to gain stage 20, where recall the signal is amplified and converted from analog to digital and connected to processor 16. In FIG. 9, processor 16 is shown in dashed outline, so as to further illustrate various computational functions that may be implemented by software programming and/or hardware on processor 16, either alone or in conjunction with other devices communicating with processor 16.

Turning to the functionality achieved in processor 16 so as to perform method 30 of FIG. 6, a digital bandpass filter 50 processes the received signal so as to eliminate noise beyond certain frequencies, based on the expected operating frequency bandwidth of transducer 12. For example, bandpass filter 50 may filter the signal so as to pass the pulse waveform frequency $f_{PT} \pm 2$ kHz. The filtered signal therefore provides a real component, which is treated as the I data of the eventual I/Q data pair. This real data, I, is coupled to a Hilbert filter 52 (or other discrete Fourier transformation) to convert the real signal to I/Q data, that is, to provide the Q data counterpart. Both the I data (from bandpass filter 50) and the Q data (from Hilbert filter 52) are connected to an amplitude determination block 54 and a phase angle detection block 56. For each sample (I,Q), amplitude determination block 54 determines the amplitude A (in Equation 1) given an understanding of phase vectors in the complex plane, whereby the Pythagoras equation shown in FIG. 9 determines the wave amplitude as the hypotenuse length given the sampled size of I and Q. Note, therefore, that this amplitude provides a measure of envelope $ENV_3$ in FIG. 7, as the amplitude rises with the increase of the sine wave amplitude (and likewise later decays). Thus, this amplitude is connected as one input to a comparator 58, which compares that amplitude to its second input, the threshold THR value, so as to achieve step 38 in FIG. 6. At the same time, also for each sample (I,Q), phase angle detection block 56 determines the momentary phase θ (in Equation 1) based on the arctangent of Q relative to I. Thus, for each sample (I,Q), the sample time $st_x$, of the sample is known and the respective momentary phase $\theta_x$ is determined, thereby providing the above discussed sample set with 2N coordinates, as $[(st_0, \theta S_0), (st_1, \theta S_1), \ldots (st_{2N}, \theta S_{2N-1})]$. With this information, the remaining steps 40 through 46 of FIG. 6 may be accomplished by a TOF estimator 60, from which a distance determination may be concluded per step 48 of FIG. 6.

From the above, the preferred embodiments are shown to provide a an improved ultrasonic transducer system and method for ultrasound time of flight (TOF) measurement and the resultant distance determination therefrom. The preferred embodiments have been shown in a favorable implementation with respect to distance detection, but note numerous aspects may apply to other systems that render additional processing from the TOF information. In view of the above, therefore, while various alternatives have been provided according to the disclosed embodiments, still others are contemplated and yet others can be ascertained by one skilled in the art. Given the preceding, therefore, one skilled in the art should further appreciate that while some embodiments have been described in detail, various substitutions, modifications or alterations can be made to the descriptions set forth above without departing from the inventive scope, as is defined by the following claims.

The invention claimed is:

1. A transducer system, comprising:
   a transducer; and
   circuitry for applying a pulse train at a frequency to excite the transducer, the transducer operable to receive an echo waveform in response to the pulse train;
   circuitry for determining a time of flight as between a first reference time associated with the pulse train and a second reference time associated with the echo waveform, the circuitry for determining comprising:
   circuitry for estimating an amplitude waveform envelope for at least a portion of the echo waveform;
   circuitry for identifying a third reference time when the amplitude waveform envelope reaches a threshold;
   circuitry for identifying a zero phase time of the echo waveform proximate to the third reference time by:
   identifying a set of samples of the echo waveform proximate in time to the third reference time;
   determining a phase of each sample of the set of samples of the echo waveform; and
   performing a line fit on the phases of the set of samples to determine the zero phase time of the echo waveform; and
   circuitry for determining the second reference time based on the zero phase time of the echo waveform.

2. The transducer system of claim 1 wherein the first reference time comprises a time of a first pulse transition in the pulse train.

3. The transducer system of claim 1 wherein the circuitry for identifying the zero phase time identifies the zero phase time as being within 2πradians of the third reference time.

4. The transducer system of claim 1 wherein the circuitry for estimating comprises circuitry for capturing a plurality of samples representative of the echo waveform, and wherein the plurality of samples includes the set of samples of the echo waveform proximate in time to the third reference time.

5. The transducer system of claim 4 wherein the circuitry for estimating further comprises:
   circuitry for converting each of the plurality of samples into an (I,Q) sample pair; and
   circuitry for determining the amplitude waveform envelope in response to a square root of the square of respective I and Q data in the (I,Q) sample pair.

6. The transducer system of claim 4 wherein the circuitry for identifying the zero phase time comprises:
   circuitry for converting each of the plurality of samples into an (I,Q) sample pair;
   circuitry for determining the phase of each sample of the set of samples based on the respective (I,Q) sample pair; and
   circuitry for determining the zero phase time based on a line approximated from a plurality of phase angles corresponding to the (I,Q) sample pairs of the set of samples.

7. The transducer system of claim 1 wherein the echo waveform is representative of an echo from a target object proximate the transducer, and further comprising circuitry for determining a distance from the transducer to the target object in response to the time of flight.

8. The transducer system of claim 1, wherein the second reference time associated with the zero phase time is within a same cycle of the echo waveform as the third reference time.

9. The transducer system of claim 8 wherein the second reference time associated with the zero phase time is within $2\pi$ radians of the third reference time.

10. The transducer system of claim 1 wherein the circuitry for applying the pulse train and the circuitry for determining the time of flight comprise a processor.

11. A method of operating a transducer system, comprising a transducer, the method comprising:
   applying a pulse train at a frequency to excite the transducer;
   receiving at the transducer an echo waveform in response to the pulse train; and
   determining a time of flight as between a first reference time associated with the pulse train and a second reference time associated with the echo waveform, the determining step comprising:
      estimating an amplitude waveform envelope for at least a portion of the echo waveform;
      identifying an envelope threshold time when the amplitude waveform envelope reaches a threshold;
      identifying a zero phase time of the echo waveform proximate to the envelope threshold time such that the zero phase time and the envelope threshold time are within a period of the echo waveform by:
         identifying a set of samples of the echo waveform proximate in time to the envelope threshold time;
         determining a phase of each sample of the set of samples of the echo waveform; and
         performing a line fit on the phases of the set of samples to determine the zero phase time of the echo waveform; and
      determining the second reference time based on the zero phase time of the echo waveform.

12. The method of claim 11 wherein the first reference time comprises a time of a first pulse transition in the pulse train.

13. The method of claim 11 wherein the step of estimating comprises capturing a plurality of samples representative of the echo waveform that includes the set of samples of the echo waveform proximate in time to the envelope threshold time.

14. The method of claim 13 wherein the step of estimating further comprises:
   converting each of the plurality of samples into an (I,Q) sample pair; and
   determining the amplitude waveform envelope in response to a square root of the square of respective I and Q data in the (I,Q) sample pair.

15. The method of claim 13 wherein the step of identifying the zero phase time comprises:
   converting each of the plurality of samples into an (I,Q) sample pair;
   determining the phase of each sample of the set of samples based on the respective (I,Q) sample pair; and
   determining the zero phase time based on a line approximated from a plurality of phase angles corresponding to the (I,Q) sample pairs of the set of samples.

16. The method of claim 11 wherein the echo waveform is representative of an echo from a target object proximate the transducer, and further comprising determining a distance from the transducer to the target object in response to the time of flight.

17. The transducer system of claim 1, wherein:
   the transducer system further includes memory;
   the circuitry for estimating the amplitude waveform envelope includes:
      circuitry for identifying a sample of the echo waveform representing a peak of the echo waveform, wherein the set of samples are centered around the sample representing the peak of the echo waveform; and
      circuitry for storing in memory the set of samples centered around the sample representing the peak of the echo waveform; and
   the estimating of the amplitude waveform envelope is performed using the subset of the set of samples.

18. The transducer system of claim 1, wherein:
   the zero phase time is a first zero phase time of the echo waveform; and
   the circuitry for identifying the first zero phase time includes:
      circuitry for identifying a second zero phase time immediately preceding the first zero phase time; and
      circuitry for identifying a third zero phase time immediately following the first zero phase time.

19. The transducer system of claim 18, wherein the circuitry for determining the second reference time determines the second reference time to one of: the first zero phase time, the second zero phase time, or the third zero phase time.

* * * * *